(12) United States Patent
Yabushita et al.

(10) Patent No.: US 8,564,427 B2
(45) Date of Patent: Oct. 22, 2013

(54) METHOD FOR ATTACHING A FLAT-SHAPED BATTERY AND APPARATUS TO BE ATTACHED TO A ROTARY PORTION

(75) Inventors: Noriyuki Yabushita, Osaka (JP); Toshikazu Yoshiba, Osaka (JP)

(73) Assignee: Hitachi Maxell, Ltd., Ibaraki-shi (JP)

( * ) Notice: Subject to any disclaimer, the term of this patent is extended or adjusted under 35 U.S.C. 154(b) by 633 days.

(21) Appl. No.: 12/829,942

(22) Filed: Jul. 2, 2010

(65) Prior Publication Data

US 2011/0001618 A1 Jan. 6, 2011

(30) Foreign Application Priority Data

Jul. 3, 2009 (JP) .................................. 2009-158997

(51) Int. Cl.
*B60C 23/00* (2006.01)
(52) U.S. Cl.
USPC ......................................... 340/442; 73/146.2
(58) Field of Classification Search
USPC ............... 340/442, 445, 440, 441, 444, 539.3, 340/636.1, 636.19; 152/415, 418; 73/146.1, 73/146.2, 146.3, 146.4, 146.5, 146.8; 29/841; 429/160
See application file for complete search history.

(56) References Cited

U.S. PATENT DOCUMENTS

| | | | |
|---|---|---|---|
| 4,221,850 A * | 9/1980 | Attinger et al. ............... | 429/160 |
| 5,656,998 A * | 8/1997 | Fujiuchi et al. ............... | 340/571 |
| 5,677,568 A * | 10/1997 | Ochi et al. .................... | 257/679 |
| 5,735,040 A * | 4/1998 | Ochi et al. .................... | 29/841 |
| 5,846,354 A * | 12/1998 | Winston et al. ............... | 152/418 |
| 6,376,109 B1 | 4/2002 | Sano et al. | |
| 7,352,276 B2 * | 4/2008 | Katou ........................... | 340/445 |
| 7,379,800 B2 * | 5/2008 | Breed .......................... | 701/33.7 |
| 7,549,327 B2 * | 6/2009 | Breed .......................... | 73/146 |
| 7,656,281 B2 * | 2/2010 | Zhou ............................ | 340/442 |
| 7,916,011 B2 * | 3/2011 | Marguet et al. .............. | 340/447 |
| 7,998,612 B2 * | 8/2011 | Sumihara et al. ............. | 429/172 |
| 2003/0000297 A1 * | 1/2003 | Ito et al. ....................... | 73/146 |
| 2006/0125612 A1 * | 6/2006 | Okubo et al. ................. | 340/445 |
| 2011/0133939 A1 * | 6/2011 | Ranganathan et al. ....... | 340/584 |

FOREIGN PATENT DOCUMENTS

JP 11-242948 A 9/1999

* cited by examiner

*Primary Examiner* — Jennifer Mehmood
*Assistant Examiner* — Rufus Point
(74) *Attorney, Agent, or Firm* — Birch, Stewart, Kolasch & Birch, LLP

(57) ABSTRACT

An apparatus to be attached to a rotary portion includes a substrate and a flat-shaped battery buried in resin. The substrate and the flat-shaped battery are connected to each other via a terminal in such a manner that one of a positive electrode can and a negative electrode can constituting the flat-shaped battery, the can having a smaller amount of deformation caused by bulging at a time of the expansion of the flat-shaped battery, is opposed to the substrate. A surface of the flat-shaped battery having a smaller amount of deformation is opposed to the substrate, and hence, adverse effects on the apparatus, such as the displacement of the terminal and the deformation of the substrate, can be reduced even when the flat-shaped battery expands.

13 Claims, 4 Drawing Sheets

METHOD FOR ATTACHING A FLAT-SHAPED BATTERY AND APPARATUS TO BE ATTACHED TO A ROTARY PORTION

BACKGROUND OF THE INVENTION

1. Field of the Invention

The present invention relates to a method for attaching a flat-shaped battery used in an apparatus that has a substrate and is to be attached to a rotary portion, and an apparatus to be attached to a rotary portion, having a substrate and a flat-shaped battery.

2. Description of Related Art

A flat-shaped battery called a coin battery or a button battery is used as a power source mainly for memory backup in information equipment, visual equipment, etc. The flat-shaped battery is a combination of a positive electrode can and a negative electrode can. The flat-shaped battery contains a power-generating element and is filled with a non-aqueous electrolyte solution. The power-generating element has a configuration in which a positive electrode material and a negative electrode material are placed via a separator.

On the other hand, the flat-shaped battery may be used as a power source of an apparatus to be attached to a rotary portion. As such an apparatus, there is an apparatus used for a tire air pressure monitoring system that monitors a tire air pressure of a traveling automobile. Some tire air pressure monitoring systems have a specification in which a transmitter containing a flat-shaped battery and also transmitting a detected pressure is attached to a wheel of a tire that is a rotary portion.

According to the above-mentioned specification, the flat-shaped battery rotates integrally with the tire to receive a centrifugal force, and the battery performance thereof may be degraded due to the flow of an electrolyte solution caused by the centrifugal force. Therefore, JP 11(1999)-242948 A proposes a method for attaching a battery in which a battery is mounted on an apparatus with a negative electrode material directed to a centrifugal force direction.

However, in the case where an apparatus containing a flat-shaped battery is attached to a wheel of a tire, it also is considered that the expansion of a battery can of the flat-shaped battery may adversely affect the apparatus. An example of such an apparatus includes the one in which a flat-shaped battery and a substrate are connected to each other via a terminal, and the flat-shaped battery and the substrate are buried in resin. In this apparatus, examples of the adverse effects caused by the expansion of the battery can include the following: the expansion of the battery can cause a force in a direction in which the terminal connecting the battery can and the substrate to each other is detached from the substrate; and further, the expansion of the battery can may deform the substrate via the resin between the battery can and the substrate. Therefore, when the expansion of the battery can is large, and the displacement amount of the terminal and the deformation amount of the substrate increase, this may lead to the detachment of the terminal from the substrate and the cracking of the substrate in worst cases.

SUMMARY OF THE INVENTION

Therefore, with the foregoing in mind, it is an object of the present invention to provide a method for attaching a flat-shaped battery capable of reducing adverse effects on an apparatus caused by the expansion of a battery can, and an apparatus to be attached to a rotary portion.

In order to achieve the above-mentioned object, a method for attaching a flat-shaped battery of the present invention is a method for attaching a flat-shaped battery used in an apparatus that has a substrate and is to be attached to a rotary portion, the flat-shaped battery being a combination of a positive electrode can and a negative electrode can opposed to each other, the method including: connecting the substrate and the flat-shaped battery to each other via a terminal in such a manner that one of the positive electrode can and the negative electrode can, the can having a smaller amount of deformation caused by bulging at a time of expansion of the flat-shaped battery, is opposed to the substrate; and burying the substrate and the flat-shaped battery in resin.

An apparatus to be attached to a rotary portion of the present invention is an apparatus to be attached to a rotary portion, having a substrate and a flat-shaped battery, wherein the flat-shaped battery is a combination of a positive electrode can and a negative electrode can opposed to each other, one of the positive electrode can and the negative electrode can, the can having a smaller amount of deformation caused by bulging at a time of expansion of the flat-shaped battery, is opposed to the substrate, the substrate and the flat-shaped battery are connected to each other via a terminal, and the substrate and the flat-shaped battery are buried in resin.

DETAILED DESCRIPTION OF THE INVENTION

The present invention enables adverse effects on an apparatus caused by the expansion of a battery can to be reduced.

According to a method for attaching a flat-shaped battery and an apparatus to be attached to a rotary portion of the present invention, one of a positive electrode can and a negative electrode can, the can having a smaller amount of deformation caused by bulging at a time of the expansion of the flat-shaped battery, is opposed to a substrate. This renders the present invention advantageous in preventing displacement of a terminal, deformation of the substrate, etc. caused by the expansion of a battery can. Thus, the possibility of leading to the detachment of the terminal from the substrate, the cracking of the substrate, etc. can be reduced.

In the method for attaching a flat-shaped battery of the present invention, it is preferred that the flat-shaped battery is placed on an inner side from the substrate with respect to a rotation center of the rotary portion. Further, in the apparatus to be attached to a rotary portion of the present invention, it is preferred that the flat-shaped battery is placed on an inner side from the substrate with respect to the rotation center of the rotary portion. According to these configurations, the alleviation of impact and vibration to the flat-shaped battery, the suppression of an increase in temperature, and the prevention of degradation in battery performance caused by a centrifugal force can be achieved.

Further, it is preferred that a mass of the flat-shaped battery is larger than a mass of the substrate.

Further, it is preferred that the rotary portion is a tire.

Figure 1:
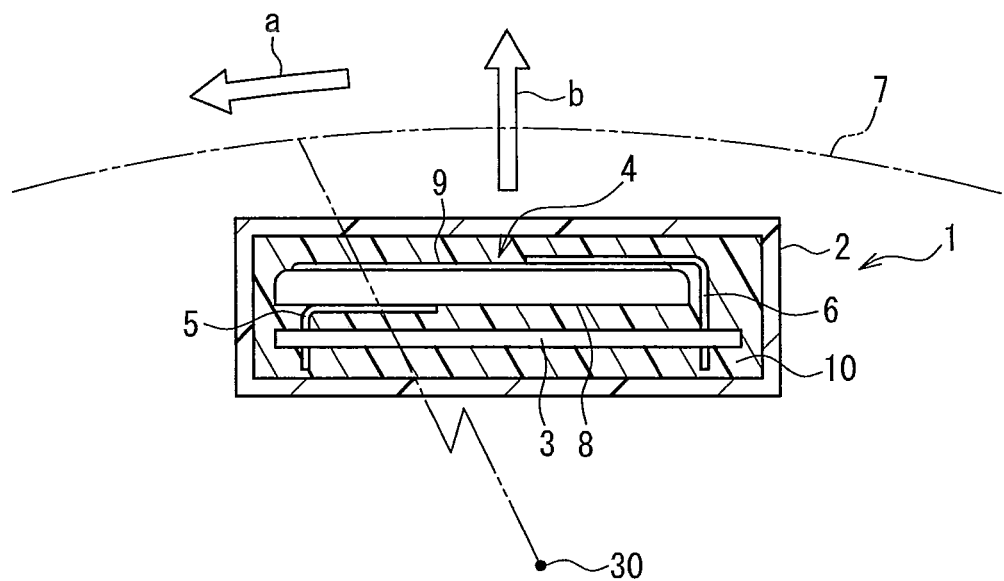
FIG. 1 is a cross-sectional view illustrating a method for attaching a flat-shaped battery according to one embodiment of the present invention.

Hereinafter, one embodiment of the present invention will be described in detail with reference to the drawings. FIG. 1 is a cross-sectional view illustrating a method for attaching a flat-shaped battery according to one embodiment of the present invention. A chain double-dashed line schematically indicates a part of the outer shape of a rotary body 7 (or a rotary portion), such as a part of a tire or a wheel of an automobile.

An apparatus 1 is fixed to the rotary body 7. When the rotary body 7 rotates in a direction of an arrow "a", the apparatus 1 integrally rotates in the direction of the arrow "a". The apparatus 1 contains a substrate 3 and a flat-shaped battery 4 in a case 2. The flat-shaped battery 4 is a combination of a positive electrode can 8 and a negative electrode 9 opposed to each other. The flat-shaped battery 4 and the substrate 3 are connected to each other via terminals 5, 6. Specifically, the terminal 5 is connected to the positive electrode can 8, and the terminal 6 is connected to the negative electrode can 9. The terminals 5 and 6 are connected to the substrate 3 so as to be inserted therein. An example of the flat-shaped battery 4 includes a battery with an outer diameter of 20 mm and a thickness of 5 mm.

The case 2 is filled with resin 10, and the flat-shaped battery 4 and the substrate 3 are buried in the resin 10. The resin 10 ensures the water resistance, moisture resistance, and the like of the apparatus 1, and is, for example, a potting material made of silicone material.

In the case where the apparatus 1 is, for example, a transmitter of a tire air pressure monitoring system, a signal of a pressure detected by the apparatus 1 is transmitted to a receiver (not shown) on a car body side by radio waves. In this example, electronic components such as a pressure sensor detecting an air pressure and a signal processing circuit transmitting a detected pressure from the pressure sensor to the receiver on the car body side by radio waves are mounted on the substrate 3 (not shown). Further, the flat-shaped battery 4 functions as a power supply source to the substrate 3.

Figure 2:
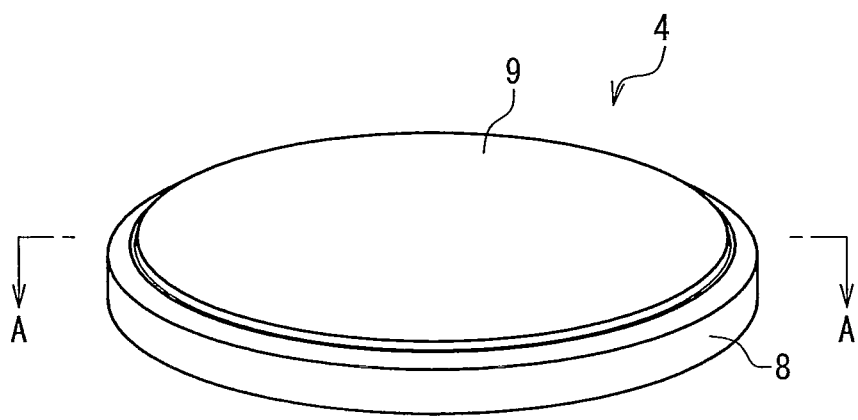
FIG. 2 is a perspective view of the flat-shaped battery used in one embodiment of the present invention.
Figure 3:
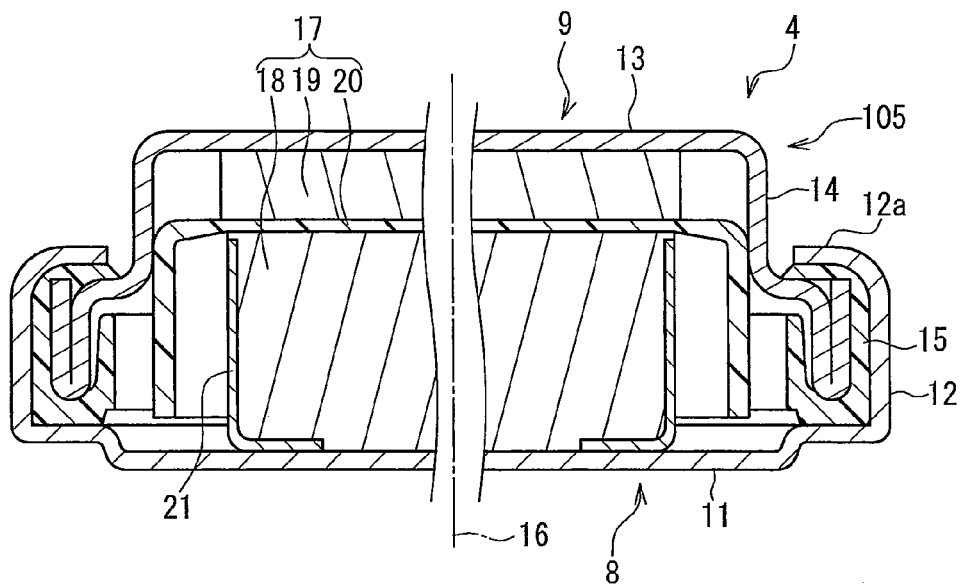
FIG. 3 is a cross-sectional view of the flat-shaped battery taken along the line A-A of FIG. 2.

FIG. 2 is a perspective view of the flat-shaped battery 4 shown in FIG. 1. In FIG. 2, the terminals 5 and 6 are not shown. FIG. 3 is a cross-sectional view taken along the line A-A of FIG. 2. The positive electrode can 8 and the negative electrode can 9 can be shaped, for example, by press-forming stainless-steel material. In FIG. 3, the positive electrode can 8 has a cylindrical shape with one end opened, in which a circumferential wall 12 rises from an outer circumference of a bottom portion 11. The negative electrode can 9 has a cylindrical shape with one end opened, in which a circumferential wall 14 rises from an outer circumference of a bottom portion 13. A gasket 15 is interposed between an inner circumferential surface of the circumferential wall 12 of the positive electrode can 8 and an outer circumferential surface of the circumferential wall 14 of the negative electrode can 9. The gasket 15 is a resin molding, and is molded with a resin composition containing polyphenylene sulfide (PPS) as a main component and olefin-based elastomer.

A tip end portion 12a of the circumferential wall 12 of the positive electrode can 8 is curved to a center axis 16 side to fix the positive electrode can 8 to the negative electrode can 9 by caulking. This seals a gap between the positive electrode can 8 and the negative electrode can 9 with the gasket 15, and insulates the positive electrode can 8 from the negative electrode can 9 having different polarities.

The flat-shaped battery 4 contains a power-generating element 17 and is filled with a non-aqueous electrolyte solution. The power-generating element 17 includes a positive electrode material 18 obtained by compressing a positive active material or the like in a disk shape, a negative electrode material 19 obtained by forming metal lithium or a lithium alloy of a negative active material in a disk shape, and a separator 20 made of nonwoven fabric. The positive electrode material 18 and the negative electrode material 19 are placed with the separator 20 placed therebetween. A positive electrode ring 21 formed of stainless steel or the like is mounted on an outer surface of the positive electrode material 18.

The positive electrode material 18 is formed by molding a positive active material integrally with the positive electrode ring 21 in a disk shape. An example of the positive active material is obtained by molding a positive mixture in which graphite, a tetrafluoroethylene-hexafluoropropylene copolymer, and hydroxypropylcellulose are mixed with manganese dioxide, followed by adjustment.

The separator 20 is formed of nonwoven fabric, for example, made of fibers of polybutylene terephthalate.

The flat-shaped battery 4 contains an electrolyte solution, and the separator 20 is impregnated with a non-aqueous electrolyte solution. As the non-aqueous electrolyte solution, a solution obtained by dissolving $LiClO_4$ in a solvent in which propylene carbonite and 1,2-dimethoxyethane are mixed can be used. The thickness of the separator 20 is, for example, about 0.3 to 0.4 mm.

The structure of the flat-shaped battery 4 is as described above. The flat-shaped battery 4 contains various components and an electrolyte solution in a hollow portion. With this configuration, when the temperature of the flat-shaped battery 4 increases, the inside of the flat-shaped battery 4 expands. For example, in the case where the rotary body 7 is a tire or a wheel of an automobile, the temperature of the flat-shaped battery 4 increases due to the outdoor use or due to the transmission of frictional heat caused by traveling on a road surface.

When the inside of the flat-shaped battery 4 expands, the positive electrode can 8 and the negative electrode can 9 also expand and are deformed as if they bulge. The shape of the positive electrode can 8 is not identical with that of the negative electrode can 9, and hence, the deformation amount at a time of the expansion is usually different between the positive electrode can 8 and the negative electrode can 9.

Figure 4:
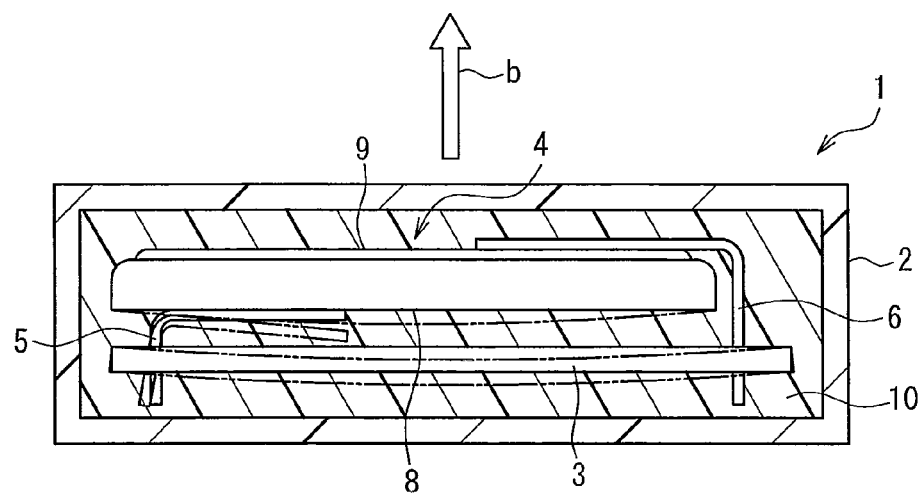
FIG. 4 is a cross-sectional view showing a state in which a positive electrode can 8 bulges to be deformed in a flat-shaped battery 4 embedded in an apparatus 1.
Figure 5:
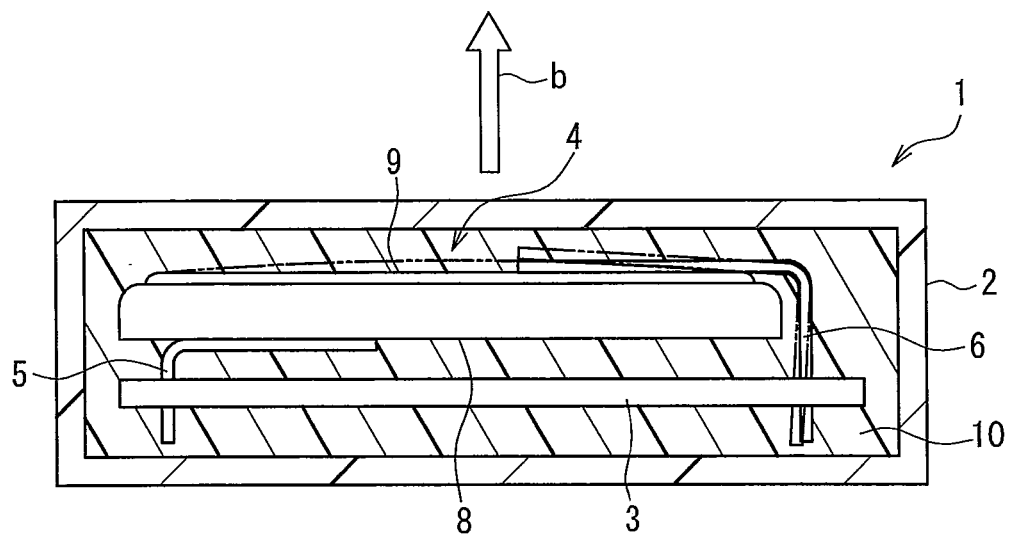
FIG. 5 is a cross-sectional view showing a state in which a negative electrode can 9 bulges to be deformed in the flat-shaped battery 4 embedded in the apparatus 1.

In the example of the apparatus 1 of FIG. 1, the deformation amount of the positive electrode can 8 caused by the expansion of the flat-shaped battery 4 is smaller than that of the negative electrode can 9. In the apparatus 1, the substrate 3 is opposed to the positive electrode can 8 whose deformation amount is small. Due to this configuration, the present invention is designed to be advantageous in preventing detachment of the terminals 5, 6 from the substrate 3 and the prevention of cracking of the substrate 3. This will be described below with reference to FIGS. 4 to 7. In FIGS. 4 and 5, for convenience of description, the state in which one of the positive electrode can 8 and the negative electrode can 9 bulges is described; however, at a time of the expansion of the flat-shaped battery 4, both of the positive electrode can 8 and the negative electrode can 9 bulge as indicated by a chain double-dashed line of FIG. 6.

FIG. 4 shows a state in which the positive electrode can 8 bulges to be deformed in the flat-shaped battery 4 embedded in the apparatus 1. As indicated by a chain double-dashed line, the positive electrode can 8 bulges to be deformed on the substrate 3 side. Along with this deformation, the terminal 5 also is displaced as indicated by the chain double-dashed line.

A tip end of the terminal 5 is inserted in the substrate 3 to be fixed thereto. The terminal 5 is illustrated with the tip end being a free end for convenience. The tip end of the terminal 5 indicated by the chain double-dashed line is displaced so as to be raised upward, compared with the tip end of the terminal 5 indicated by a solid line. Thus, a force acts on the terminal 5 in a direction in which the terminal 5 is detached from the substrate 3, along with the deformation of the positive electrode can 8.

Due to the bulging of the positive electrode can 8, the substrate 3 is bent to be deformed via the resin 10 as indicated by the chain double-dashed line. The deformation of the substrate 3 may cause cracking of the substrate 3. Further, the deformation of the substrate 3 is the one in a direction in which the terminals 5, 6 are detached from the substrate 3.

Next, in FIG. 1, when the rotary body 7 rotates in the direction of the arrow "a", a centrifugal force acts on the apparatus 1 and the flat-shaped battery 4 embedded in the apparatus 1 in a direction of an arrow "b". In FIG. 4, in the case where the substrate 3 is fixed to the case 2, and the flat-shaped battery 4 is fixed to the substrate 3 by the terminals 5, 6 whose tip ends are fixed to the substrate 3, a centrifugal force in the direction of the arrow "b" acts on the flat-shaped battery 4 in a direction in which the flat-shaped battery 4 moves away from the substrate 3.

As described above, along with the deformation of the positive electrode can 8 and the substrate 3, a force acts in a direction in which the terminals 5, 6 are detached from the substrate 3. Therefore, when the deformation amounts of the positive electrode can 8 and the substrate 3 increase, the terminals 5, 6 are more likely to be detached from the substrate 3. In addition, when a centrifugal force acts in a direction in which the flat-shaped battery 4 moves away from the substrate 3, the terminals 5, 6 are much more likely to be detached from the substrate 3.

Accordingly, the deformation amount of a surface (surface of the positive electrode can 8 in FIG. 4) opposed to the substrate 3 among both surfaces of the flat-shaped battery 4, caused by the expansion of the flat-shaped battery 4, is desirably as small as possible.

FIG. 5 shows a state in which the negative electrode can 9 bulges to be deformed in the flat-shaped battery 4 embedded in the apparatus 1. The negative electrode can 9 on an opposite side of the positive electrode can 8 with respect to the substrate 3 bulges to be deformed on an opposite side of the substrate 3, as indicated by a chain double-dashed line. Along with the deformation, the terminal 6 also is displaced as indicated by the chain double-dashed line.

A tip end of the terminal 6 is inserted in the substrate 3 to be fixed thereto. The terminal 6 is illustrated with the tip end being a free end for convenience. The tip end of the terminal 6 indicated by the chain double-dashed line is displaced so as to sink downward, compared with the tip end of the terminal 6 indicated by a solid line. Thus, along with the deformation of the negative electrode can 9, a force acts on the terminal 6 in a direction in which the terminal 6 is inserted in the substrate 3.

On the other hand, in FIG. 4, the substrate 3 also is bent to be deformed via the resin 10 as indicated by the chain double-dashed line due to the bulging of the positive electrode can 8, whereas in FIG. 5, the negative electrode can 9 on the opposite side of the substrate 3 is deformed. Therefore, the deformation of the substrate 3 involved in the deformation of the negative electrode can 9 does not particularly occur, and a force does not act on the substrate 3 in a direction in which the terminals 5, 6 are detached from the substrate 3.

Further, in the same way as in FIG. 4, a centrifugal force in the direction of the arrow "b" acts in a direction in which the flat-shaped battery 4 moves away from the substrate 3. However, in FIG. 5, there is no action of a force in a direction in which the terminals 5, 6 are detached from the substrate 3, involved in the deformation of the positive electrode can 8, as describe above. Therefore, in terms of keeping the connection of the terminals to the substrate 3 exactly, the configuration in which the negative electrode can 9 on the opposite side of the substrate 3 is deformed as shown in FIG. 5 is more advantageous, compared with the configuration in which the positive electrode can 8 on the substrate 3 side is deformed as shown in FIG. 4.

Accordingly, even when the surface (surface of the negative electrode can 9 in FIG. 5) of the flat-shaped battery 4 on the opposite side of the substrate 3 among both surfaces of the flat-shaped battery 4 is deformed as if it bulges, such a deformation is not particularly disadvantageous to the detachment of the terminals from the substrate 3 and the deformation of the substrate 3.

Figure 6:
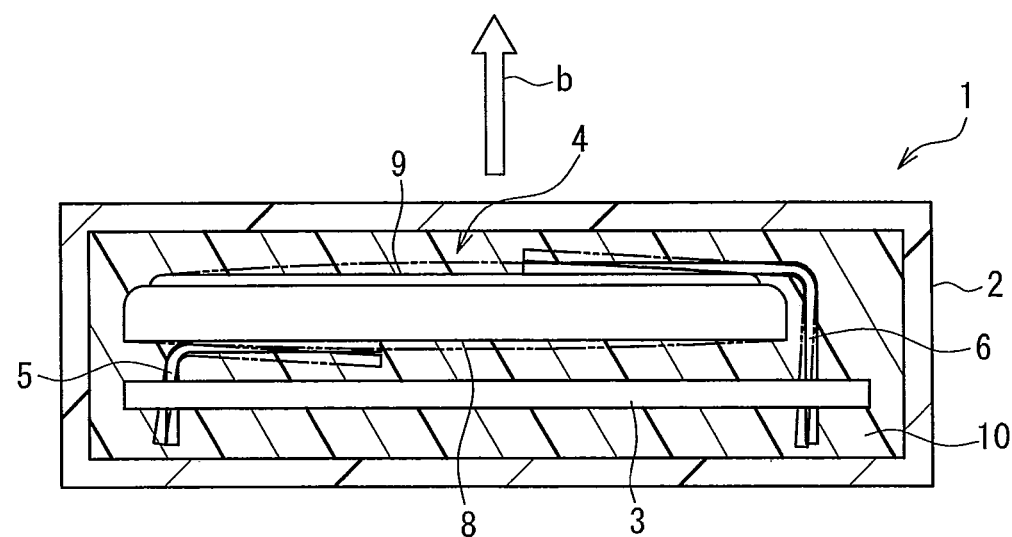
FIG. 6 is a cross-sectional view showing a state in which both the positive electrode can 8 and the negative electrode can 9 bulge to be deformed in the flat-shaped battery 4 embedded in the apparatus 1.

FIG. 6 shows a state in which both the positive electrode can 8 and the negative electrode can 9 bulge to be deformed in the flat-shaped battery 4 embedded in the apparatus 1. For convenience of description, FIGS. 4 and 5 show the state in which one of the positive electrode can 8 and the negative electrode can 9 bulges. However, at a time of the expansion of the flat-shaped battery 4, both of the positive electrode can 8 and the negative electrode can 9 bulge to be deformed, as shown in FIG. 6.

As described with reference to FIG. 4, when the deformation amount of the surface (surface of the positive electrode can 8 in FIG. 4) opposed to the substrate 3 among both surfaces of the flat-shaped battery 4 increases, the deformation amount of the substrate 3 also increases, and the terminals 5, 6 are more likely to be detached from the substrate 3. Further, due to the centrifugal force in the direction of the arrow "b", the terminals 5, 6 are much more likely to be detached from the substrate 3. Therefore, the deformation amount of the positive electrode can 8 opposed to the substrate 3 is desirably as small as possible.

On the other hand, as described with reference to FIG. 5, even when the surface (surface of the negative electrode can 9 in FIG. 5) on the opposite side of the substrate 3 among both surfaces of the flat-shaped battery 4 is deformed as if it bulges, such deformation is not particularly disadvantageous to the detachment of the terminals 5, 6 from the substrate 3 and the deformation of the substrate 3.

Thus, opposing the surface having a smaller deformation amount at a time of the expansion of the flat-shaped battery 4 among both surfaces of the flat-shaped battery 4 to the substrate 3 is advantageous in preventing detachment of the terminals 5, 6 from the substrate 3 and cracking of the substrate 3 caused by the deformation of the substrate 3. In the example of the present embodiment, the deformation amount of the positive electrode can 8 at a time of the expansion of the flat-shaped battery 4 is smaller than that of the negative electrode can 9. Therefore, as shown in FIG. 1, the positive electrode can 8 is opposed to the substrate 3.

The magnitude relation of the deformation amounts of the negative electrode can 9 and the positive electrode can 8 can be determined based on the deformation amount of the flat-shaped battery 4 on the center axis 16 (FIG. 3). Further, the magnitude relation of the deformation amounts is not always identical if the types of electrode cans are different. Therefore, the magnitude relation of the deformation amounts is checked previously for each type, and which of the negative electrode can 9 or the positive electrode can 8 should be opposed to the substrate 3 is determined.

Figure 7:
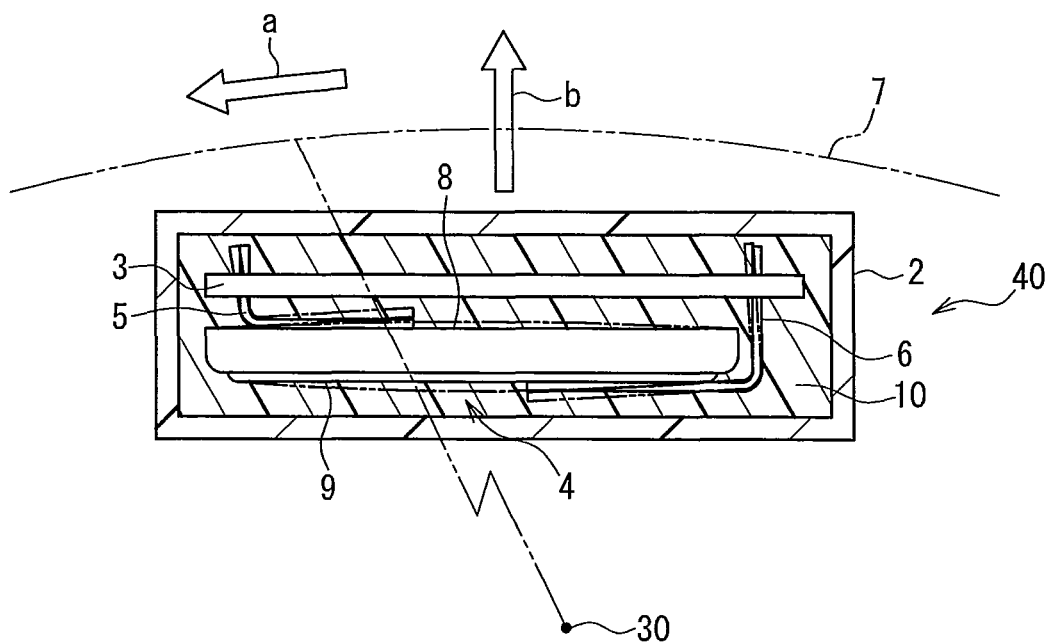
FIG. 7 is a cross-sectional view showing an apparatus according to another embodiment of the present invention.

FIG. 7 is a cross-sectional view showing an apparatus according to another embodiment of the present invention. In the apparatus 1 shown in FIG. 1, the substrate 3 is placed on an inner side from the flat-shaped battery 4 with respect to a rotation center 30 of the rotary body 7. In contrast, in an apparatus 40 of FIG. 7, the flat-shaped battery 4 is placed on an inner side from the substrate 3 with respect to the rotation center 30 of the rotary body 7. More specifically, in the apparatus 40 of FIG. 7, the vertical relationship between the substrate 3 and the flat-shaped battery 4 is reversed, compared with the apparatus 1 of FIG. 1.

Even in the apparatus 40, the positive electrode can 8 having a smaller deformation amount compared with that of the negative electrode can 9 is opposed to the substrate 3, and thus, the terminals 5, 6 are prevented from being detached from the substrate 3, which prevents cracking of the substrate 3 due to the deformation of the substrate 3.

In FIG. 7, the substrate 3 is placed on an outer side of the rotary body 7 from the flat-shaped battery 4. Therefore, impact from outside of the rotary body 7 is applied to the substrate 3 more directly, compared with the flat-shaped battery 4, and the impact and vibration to the flat-shaped battery 4 are alleviated.

Further, in the case where the rotary body 7 is a tire or a wheel of an automobile, frictional heat caused by traveling on a road surface is transmitted also to the apparatus 40. In this case, the frictional heat is applied to the substrate 3 on an outer side from the flat-shaped battery 4 more directly. Thus, in the configuration in which the substrate 3 is placed on an outer side from the flat-shaped battery 4, the increase in temperature of the flat-shaped battery 4 is suppressed, compared with the configuration in which the flat-shaped battery 4 is placed on an outer side from the substrate 3. Therefore, the configuration in which the substrate 3 is placed on an outer side from the flat-shaped battery 4 brings about an advantage to the flat-shaped battery 4 whose use in a high temperature is desirably avoided, compared with the configuration in which the substrate 3 is placed on an inner side from the flat-shaped battery 4.

Next, as described above, the flat-shaped battery 4 contains an electrolyte solution. When a centrifugal force involved in the rotation of the rotary body 7 increases, the battery performance may be degraded due to the flow of an electrolyte solution caused by the centrifugal force. The configuration in which the substrate 3 is placed on an outer side from the flat-shaped battery 4 as shown in FIG. 7 is more advantageous in preventing degradation in battery performance caused by a centrifugal force, compared with the configuration in which the flat-shaped battery 4 is placed on an outer side from the substrate 3.

More specifically, in the case where the rotation number of the rotary body 7 is constant, the centrifugal force acting on the flat-shaped battery 4 is proportional to the distance from the rotation center 30 to the flat-shaped battery 4. Therefore, as the flat-shaped battery 4 is placed closer to the rotation center 30, the centrifugal force acting on the flat-shaped battery 4 becomes smaller.

Accordingly, in the configuration in which the substrate 3 is placed on an outer side from the flat-shaped battery 4 as shown in FIG. 7, the flat-shaped battery 4 is positioned closer to the rotation center 30, compared with the configuration in which the flat-shaped battery 4 is placed on an outer side from the substrate 3, and the configuration in which the substrate 3 is placed on an outer side from the flat-shaped battery 4 is advantageous in preventing degradation in battery performance caused by a centrifugal force.

In an apparatus to be attached to a rotary body, having a substrate and a flat-shaped battery, the flat-shaped battery 4 usually is placed on an outer side from the substrate 3 with respect to the rotation center 30 of the rotary body 7 contrary to the configuration of FIG. 7. The reason for this is as follows: it generally is reasonable to consider that the rotation of the apparatus 1 becomes more stable when the flat-shaped battery 4 whose mass and centrifugal force are larger than those of the substrate 3 is placed on an outer side from the substrate 3.

In the embodiment shown in FIG. 7, the flat-shaped battery 4 is placed purposely on an inner side from the substrate 3 with respect to the rotation center 30 of the rotary body 7 contrary to such a general design procedure, and thus, the alleviation of impact and vibration to the flat-shaped battery 4, the suppression of an increase in temperature, and the prevention of degradation in battery performance caused by a centrifugal force are performed.

Further, the rotary body 7 may be a tire or a wheel. In the case where the rotary body 7 is a tire, a larger centrifugal force acts, and hence, the effects of the present invention can be exhibited more.

The size of the flat-shaped battery 4 and the materials for constituent components have been described with reference to FIGS. 2 and 3. However, the size and the materials are shown merely as an illustration, and other sizes and materials may be used.

In the above-mentioned embodiments, the effects of the present invention have been described particularly in connection with the detachment of terminals from a substrate and the cracking of the substrate. However, even if the detachment of the terminals from the substrate and the cracking of the substrate do not occur, the expansion of a battery can may cause the displacement of the terminals, the deformation of the substrate, etc., which have various adverse effects on an apparatus containing a flat-shaped battery. As is apparent from the above-mentioned descriptions, the present invention is advantageous in the reduction in various adverse effects on an apparatus caused by the expansion of a battery can and is useful for a method for attaching a flat-shaped battery used in a rotary portion and an apparatus to be attached to the rotary portion.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method for attaching a flat-shaped battery used in an apparatus that has a substrate and is to be attached to a rotary portion,
    the flat-shaped battery being a combination of a positive electrode can and a negative electrode can opposed to each other, and
    the method comprising:
    connecting the substrate and the flat-shaped battery to each other via a terminal;

wherein one of the positive electrode can and the negative electrode can is opposed to an inner or outer side of the substrate with respect to a rotation center of the rotary portion;

the negative electrode can has a different amount of deformation than the positive electrode can, wherein the deformation is caused by bulging at a time of expansion of the flat-shaped battery; and the can having the smaller amount of deformation is opposed to the substrate; and burying the substrate and the flat-shaped battery in resin.

2. The method for attaching a flat-shaped battery according to claim 1, wherein the flat-shaped battery is placed on the inner side of the substrate with respect to the rotation center of the rotary portion.

3. The method for attaching a flat-shaped battery according to claim 1, wherein a mass of the flat-shaped battery is larger than a mass of the substrate.

4. The method for attaching a flat-shaped battery according to claim 1, wherein the rotary portion is a tire.

5. An apparatus to be attached to a rotary portion, comprising a substrate and a flat-shaped battery, wherein the flat-shaped battery is a combination of a positive electrode can and a negative electrode can opposed to each other, wherein one of the positive electrode can and the negative electrode can is opposed to an inner or outer side of the substrate with respect to a rotation center of the rotary position;

the negative electrode can has a different amount of deformation than the positive electrode can, wherein the deformation is caused by bulging at a time of expansion of the flat-shaped battery; and the can having the smaller amount of deformation is opposed to the substrate;

the substrate and the flat-shaped battery are connected to each other via a terminal, and the substrate and the flat-shaped battery are buried in resin.

6. The apparatus to be attached to a rotary portion according to claim 5, wherein the flat-shaped battery is placed on the inner side of the substrate with respect to the rotation center of the rotary portion.

7. The apparatus to be attached to a rotary portion according to claim 5, wherein a mass of the flat-shaped battery is larger than a mass of the substrate.

8. The apparatus to be attached to a rotary portion according to claim 5, wherein the rotary portion is a tire.

9. The apparatus to be attached to a rotary portion according to claim 5, wherein the apparatus is a transmitter of a tire air pressure monitoring system.

10. The method for attaching a flat-shaped battery according to claim 1, wherein the negative electrode can has a smaller amount of deformation than the positive electrode can.

11. The method for attaching a flat-shaped battery according to claim 1, wherein the negative electrode can has a larger amount of deformation than the positive electrode can.

12. The apparatus to be attached to a rotary portion according to claim 5, wherein the negative electrode can has a smaller amount of deformation than the positive electrode can.

13. The apparatus to be attached to a rotary portion according to claim 5, wherein the negative electrode can has a larger amount of deformation than the positive electrode can.

* * * * *